United States Patent [19]

Arey, Jr. et al.

[11] 3,888,793

[45] June 10, 1975

[54] RARE EARTH CHRYSOTILE CATALYSTS

[75] Inventors: William F. Arey, Jr.; Willard H. Sawyer, both of Baton Rouge, La.

[73] Assignee: Exxon Research and Engineering Company, Linden, N.J.

[22] Filed: Jan. 17, 1973

[21] Appl. No.: 324,553

[52] U.S. Cl............. 252/454; 252/455 R; 252/456; 252/457; 252/458; 252/459; 252/462
[51] Int. Cl. .... B01j 11/40; B01j 11/06; B01j 11/32
[58] Field of Search................. 252/454, 455 R, 462

[56] References Cited
UNITED STATES PATENTS

| | | | |
|---|---|---|---|
| 3,140,253 | 7/1964 | Plank et al. | 252/455 Z |
| 3,451,947 | 6/1969 | Michael | 252/453 |
| 3,729,429 | 4/1973 | Robson | 252/454 |

*Primary Examiner*—Carl F. Dees
*Attorney, Agent, or Firm*—Llewellyn A. Proctor

[57] ABSTRACT

New complex metal silicate hydrocarbon conversion catalysts, especially chrysotiles, are provided. In one embodiment synthetic chrysotiles of Mg, Co or Ni are provided wherein 0–30% of the Mg, Co or Ni has been replaced in the synthesis mix by V, Cr, Mo, W, Mn, Re, Cu, Al, Zn or Group VIII metals, and an additional 1–20% of the Mg, Co or Ni has been replaced in the synthesis mix by rare earths, La being the most preferred. Such chrysotiles have improved stability and catalytic activity for hydrocarbon conversion reactions such as cracking, reforming, hydrocracking, aromatization, polymerization, alkylation, isomerization, hydrodesulfurization, and the like.

10 Claims, No Drawings

RARE EARTH CHRYSOTILE CATALYSTS

IMPROVED RARE EARTH CHRYSOTILE CATALYSTS

This invention relates to improved complex metal silicate hydrocarbon conversion catalysts, and more specifically to improved chrysotile catalysts for use in hydrocarbon conversion reactions.

It is disclosed in commonly owned, co-pending U.S. Pat. application Ser. No. 68,324, U.S. Pat. No. 3,729,429 filed Aug. 31, 1970 by H. E. Robson, that layered complex metal silicates, particularly chrysotiles, of shapes ranging from very thick-walled tubes (substantially rod-like in character) through moderately thick-walled tubes, thin wall tubes, and flakes can be synthetically prepared by reacting at moderate temperatures and pressures, in alkaline media and at critical concentration, soluble forms of silica, and certain metals or their oxides and hydroxides. The layered complex metal silicates, including chrysotiles, disclosed in said co-pending application, are of crystalline structure chemically characterized by repeating units represented by the following structural formula:

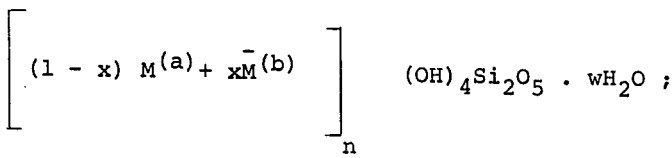

where M and $\bar{M}$ are selected from monovalent and multivalent cations, of valence ranging from 1 to 7, having an effective ionic radius (Goldschmidt radius, Effective Radii of Atoms and Ions from Crystal Structure, Page 108, Lange's Handbook of Chemistry, Tenth Edition, Handbook Publishers, Inc., Sandusky, Ohio) ranging from about 0.5 to about 1 A, and preferably from about 0.57 to about 0.91 A, $x$ is a number ranging from 0 to 1, this number expressing the atomic fraction of the metals M and $\bar{M}$, $a$ is the valence of M, $b$ is the valence of $\bar{M}$, $n$ is a number equal to the value defined by the ratio $6/[a(1-x)+bx]$, and $w$ is a number ranging from 0 to 4.

The most preferred of these compositions are the chrysotiles because they are admirably suitable for direct or indirect use as hydrocarbon conversion catalysts or catalyst supports. For the purposes of this invention, chrysotiles are those compositions defined in the above formula wherein the $Si_2O_5$, or serpentine layers of the repeating unit which form the crystals are of smaller length or diameter than the associated metal hydroxide layers to which the serpentine layers are adjoined. This characteristic structure is distinguishable from other layered complex metal silicates, and other layered complex metal silicates, and other crystalline substances, by X-ray diffraction patterns whether the crystal structures exist as tubes or flakes.

It is known that the mineral chrysotile is formed of paired serpentine and brucite layers which do not match, and hence the crystal is strained. Consequently, this gives rise to different physical forms and shapes inasmuch as relief from the strain is gained by a curl of the crystal along its long axis so that chrysotile exists, in nature, as cylindrically shaped rods or thick wall tubes. In the process of U.S. Pat. application Ser. No. 68,324, the complex metal silicates are formed as thick wall tubes, thin wall tubes, curls or flakes, as desired, from gels as paired layers of different sizes. Layers of silicon-oxygen sheets are combined with layers of hydroxyl groups cemented to the silicon-oxygen sheets by metal cations. Each of the repeating units, considering for convenience the anhydrous form, is thus formed of a layer of serpentine, or $Si_2O_5$, and an adjacent larger sized layer of metal chemically combined with hydroxyl ions, or $[(1-x)M^{(a)}+x\bar{M}^{(b)}]_n$ $(OH)_4$, to which the former is fused. The paired, fused metal-hydroxyl ions and serpentine layers are held together by very strong forces of attraction, while the repeating units of paired layers per se are held together by weaker forces of attraction. A serpentine or $Si_2O_5$ layer is formed of a sheet of linked $SiO_4$ tetrahedra, three oxygen atoms of each $SiO_4$ being shared with adjacent $SiO_4$ tetrahedra in the same layer. The vertices of all the tetrahedra point in the same direction, or outwardly for a rod or tube structure. In the metal-hydroxyl layer or $[(1-x)M^{(a)}+x\bar{M}^{(b)}]_n$ $(OH)_4$ layer, one-third of the oxygen atoms are oxygen ions $[O^{-2}]$ which are shared with silica tetrahedra of the adjacent serpentine or $Si_2O_5$ layer. The remaining oxygen atoms are hydroxyl groups, and these are associated only with M or $\bar{M}$ cations. Thus, the M or $\bar{M}$ cations are surrounded by six ions, four hydroxyl groups, or ions, and two oxygen ions in a case where the metal is a divalent cation such as magnesium.

These forms of layered complex metal silicates can thus be logically considered as chrysotiles, or substituted chrysotiles, since they possess the chrysotile structure; and have been so characterized in the art in the forms known to exist — viz., as chrysotile, or magnesium chrysotile, $Mg_3(OH)_4Si_2O_5$, as nickel chrysotile, $Ni_3(OH)_4Si_2O_5$ and as cobalt chrysotile, $Co_3(OH)_4Si_2O_5$. Using the Pauling notation, a repeating unit of the crystalline structure comprising five tiers of ions (1 through 5) can be conveniently illustrated as follows:

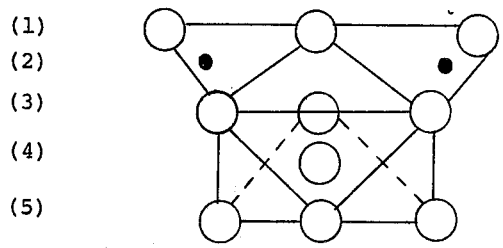

Tier 1 is constituted entirely of oxygen ions. Tier 2, constituting the tetrahedral cation position, is essentially constituted of silicon ions. Tier 3 is constituted of both oxygen and hydroxyl ions — viz., two oxygen ions and a hydroxyl ion. Tier 4, which constitutes the octahedral cation position, is constituted of a monovalent or multivalent metal cation M or $\bar{M}$. This is the primary cation site for substitution of the various metals represented by M and $\bar{M}$ into the crysotile structure. Where only magnesium is contained in the octahedral cation position, the chemical structure is that of chrysotile; and where nickel or cobalt is wholly substituted for magnesium, the chemical structure is also that heretofore produced synthetically and known as nickel chrysotile (or garnierite) and cobalt chrysotile. Tier 5 is constituted entirely of hydroxyl ions. The serpentine or $Si_2O_5$ layer is constituted of those tiers of ions ranging from 1 through 3, and the metal-hydroxyl ion layer is constituted of those tiers of ions ranging from 3 through 5. Two of ions of Tier 3 are shared between the serpentine layer and the metal-hydroxyl ion layer, while the third ion is more identifiable with the metal-hydroxyl ion layer. In the repeating unit Tier 1 contains 3 oxygen atoms, Tier 2 contains 2 silicon atoms, Tier 3 contains 2 oxygen atoms and 1 hydroxyl ion, Tier 4 contains 3 magnesium ions and Tier 5 contains 3 hydroxyl ions. While it is not apparent from accepted Pauling notation, the two layers are not of the same dimension, the metal-hydroxyl ion layer being of greater length than the serpentine layer so that there is a misfit of the two layers, and hence a strain between the paired layers which form a repeating unit.

The metal-hydroxyl ion layer of a repeating unit is of greater area (and length at least in one dimension) than an adjoining serpentine layer, the misfit between the two layers producing a stress-strain relationship which causes the layers to curve in a direction such that the concave side of the metal-hydroxyl ion layer adjoins the convex side of the serpentine layer. When the chrysotile is in tubular shape, this means that the structure is of coil shape, or is formed of a series of concentric-like paired layers of the repeating units and the serpentine layer is the smaller diameter member of the paired layers.

It has been determined that the most preferred hydrocarbon conversion catalysts according to the above formula of the synthetic chrysotile wherein M is Mg, Co or Ni, $x$ ranges from 0–0.3, and $\bar{M}$ is V, Cr, Mo, W, Mn, Re, Cu, Al, Zn, or one of the Group VIII metals. While these materials have been shown to be generally effective as hydrocarbon conversion catalysts they have two basic deficiencies: (1) they have poor high temperature stability at temperatures which may be encountered; and, (2) they have insufficient acidity to support high cracking rates.

Accordingly, it is an object of the present invention to provide hydrocarbon conversion catalysts having high stability and sufficient acidity to support high cracking rates.

These and other objects are achieved by the present invention which provides a layered complex metal silicate composition characterized as having repeating units defined by the following structural formula:

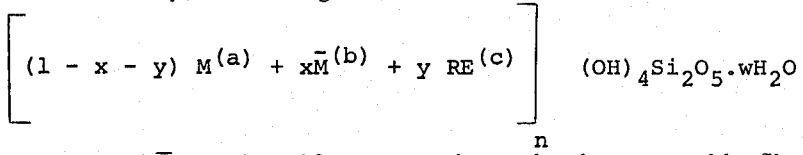

where M and $\bar{M}$ are selected from monovalent and multivalent metal cations, of Groups IA, IB, IIA, IIB, IIIA, IIIB, IVB, VB, VIB, VIIB and VIII of the periodic table of elements, having an effective ionic radius ranging from about 0.5 to about 1.0 A, Re is a metal, preferably La, selected from the group of rare earth metals, $x$ is a number which expresses the atomic fraction of the metal $\bar{M}$ and ranges from about 0 to 0.30, $y$ is the atomic fraction of RE and ranges from about 0.02 to about 0.20, $a$ expresses the valence of M and is an integer ranging from 1 to 7, $b$ expresses the valence of M and is an integer ranging from 1 to 7, $c$ expresses the valence of RE and is an integer ranging from 1 to 4, $n$ is a number equal to the value defined by the ratio $6/[a(1-x-y)+bx+cy]$, and $w$ is a number ranging from 0 to 4.

Preferably, M is selected from the group consisting of Mg, Co and Ni; and $\bar{M}$ is selected from the group consisting of V, Cr, Mo, W, Mn, Re, Cu, Al, Zn, or one of the Group VIII metals. The value of $x$ will preferably be within the range from about 0.05 to 0.25, and the value of $y$ will preferably be within the range from about 0.02 to 0.10. While all of the various physical forms of the chrysotiles of this invention are found to be useful, the high surface area flakes, having surface areas ranging from about 250m$^2$/g to about 600m$^2$/g, are preferred.

As noted above, M and $\bar{M}$ are monovalent and multivalent cations having an effective ionic radius ranging from about 0.5 to about 1.0 A. The rare earths, and especially lanthanum, have radii in excess of 1.0 A. These large diameter atoms can be incorporated into the chrysotile by a "compensation effect". Part of the Mg, Ni or Co (0–30%) is replaced by a metal having an effective ionic radius in the low range, e.g., 0.5–0.6 A. Thus, due to the compensation effect of their small cation a cation with an effective radius greater than 1.0 A can be incorporated into the structure within the limits prescribed above. Aluminum is an especially effective small cation for effecting this "compensation".

The above-mentioned co-pending U.S. patent application Ser. No. 68,324 discusses the methods for preparing complex metal silicates such as chrysotiles in physical forms and shapes ranging generally from cylindrical shaped rods through thick walled tubes, from thick walled tubes through thin walled tubes, and from thin walled tubes through flakes. This disclosure is specifically incorporated herein by reference. According to the process disclosed in that application, it is feasible, at low severity process conditions, to synthesize these complex metal silicates from solutions containing reactive silicates, and reactive forms of the desired metal, e.g. soluble salts, or oxides and hydroxides. The reactants are combined in alkaline medium at moderate temperature and pressure. The complex metal silicates are formed in two steps. In the first step, a synthesis gel is formed by co-participation of the metal oxides or hydroxides with hydrosilicate gel in alkaline medium. In the second step, the gel is heated at from about 200°C. to about 350°C., and preferably from about 250°C. to about 275°C., so that the chrysotile product is crystallized from the synthesis gel with rejection of excess water and soluble salts which are removed by filtration at washing. At the time of formation of the synthesis gel, the composition of the metal hydroxide layer of the crystal is fixed by selecting the concentration of metals to vary the ratios of M/$\bar{M}$/RE, as desired.

The reaction is effected by the use of highly alkaline mediums of critical pH. High alkalinity causes the reaction to proceed at relatively mild conditions. This favorable effect, which makes it generally unnecessary to conduct the reactions at high temperatures and pressures, is not completely understood. The highly alkaline medium is believed to cause breakage of the silicon oxygen bonds, or depolymerization of the SiO$_2$ components, so that the latter become more freely migratory within the solution of gel even at relatively low temperatures and pressures. In any event, the alkali concentration can be varied, as desired, in the reaction system to provide a variety of complex metal silicates, some resembling products found in nature, either in their chemical or physical characteristics, and many products as regards either their chemical or physical characteristics which are not found in nature.

The nature of the reaction by virtue of which pH can be used to control the physical forms of the chrysotiles produced is thus not entirely understood, but it appears that the strain produced by the misfit of the unequal sized serpentine $Si_2O_5$, and the larger metal-hydroxyl ion layers are, in part, responsible for this phenomenon. Thus, at the selected low severity conditions, the strain is greatest on the layers farthest away from the equilibrium diameter. At a given intermediate pH, crystals assume the form of thin wall multilayer structures of only a few layers thickness. These crystals are of high surface area and possess relatively large internal openings. At higher pH, the walls are thick, or the structure is even rod-like. At lower pH, the strain between the paired layers causes the tube to break apart to form high surface area, thin flakes. The use or substitution of metal cations of different sizes in the octahedral cation position, which is believed to be the primary cation site for substitutions, further alters the stress-strain relationship between the forming crystals. It is found generally that cations which most closely approach in size the effective ionic radius of magnesium are most readily substituted, and are substituted in highest concentration. It also appears that the size of the metal hydroxide layer of a crystal structure is directly related to the size of the cation substituted for magnesium. Hence, the stress-strain relationship is altered by the substitution so as to cause a misfit between the larger metal hydroxide layer and the adjacent smaller serpentine layer, the net effect being curvature of the structure.

By judicious selection of pH at a given temperature and pressure, specimens of definite character can be formed. At different levels of pH the character of the crystals can be controlled so that a given chemical specimen can be formed in the shape of rods, tubes, curls, or thin flakes. Surface areas are also controlled by the proper selection of conditions, with surface area increasing as pH is lowered to favor, directionally, the production of rods through thick wall tubes, thin wall tubes, and flakes. At higher pH levels rods or thick wall tubes of surface area less than about 110 $m^2/g$ can be formed. As the pH is lowered, the tube walls get thinner so that tubes can preferably be formed which have surface areas within the range of from about 150 $m^2/g$ to about 250 $m^2/g$, and higher, and, more preferably, within the range of from about 160 $m^2/g$. The thin walled tubes generally yield surface areas no greater than about 200 $m^2/g$ to about 250 $m^2/g$. As pH is further lowered to obtain higher surface areas, the thin walled tubes form curls (or mal-formed tubes), and then break apart and form higher surface area flakes, the walls of which, directionally, also become thinner as pH is lowered. Preferably, flakes can be formed with surface areas ranging from about 250 $m^2/g$ to about 600 $m^2g$, and, more preferably, from about 250 $m^2g$ to about 450 $m^2g$. The actual transition points vary to some extent dependent largely upon the nature of the complex metal, or metals, used in formation of the complex metal silicate. The thickness of the walls of the tubes can thus be directly controlled by the selected pH. Thin wall tubes of only a few paired layers, e.g., 4 to 8 in thickness, can be formed. Such tubes ranging from about 20 A to about 70 A, and preferably from about 28 A to about 45 A, in thickness provide tubes of far greater inside diameter than occurs in the corresponding natural products, providing far greater adsorption space and accessibility for catalytic contact by reactant materials upon catalytic surfaces. As indicated above, as the pH is further decreased from that which generates thin wall tubes, the tubes begin to curl and then break apart to form thin flakes of very high surface area. At surface areas above about 250 $m^2/g$ the chrysotile compositions are usually formed as relatively thin flakes. The thin flakes, because of their ultrahigh surface areas, are the most preferred compositions for use in most hydrocarbon conversion reactions. The flakes range in thickness from about 15 to about 50 A, and preferably from about 20 to 30 A.

Various alkaline materials can be used in the process, providing they possess sufficient alkalinity to raise the reaction medium to the necessary pH, do not react to a significant extent with the forming complex metal silicates, or intermediate materials, precipitate the silica, or decompose to gaseous products. Most preferred of these alkaline materials, for these reasons, are the alkali metal and alkaline earth metal hydroxides, exemplary of which are Group IA metal hydroxides such as sodium hydroxide, potassium hydroxide, cesium hydroxide, and the like, and Group IIA metal hydroxides such as barium hydroxide, strontium hydroxide, and the like. A satisfactory Group IIIA metal hydroxide is thallium hydroxide. Various other materials such as tetra alkyl ammonium hydroxides, e.g., tetra methyl ammonium hydroxide, can be employed.

Various sources of silica can be employed in the present process, these including essentially any of the conventional, widely used silica sources such as silica per se, diatomaceous earths, silica hydrogel, silica hydrosol, alkali metal silicates, e.g., sodium silicate, and the like. Particularly preferred sources of silicates are silica sol, silica gel, and sodium silicate solution (water glass).

Virtually any form of compound which is sufficiently soluble and compatible with the reaction mixture, which contains the desired M or $\bar{M}$ metal, can be used as a source of the metal. Soluble salts of the metals, or mixtures of such salts, e.g., halides, sulfides, sulfates, nitrates, carbonates, acetates, phosphates, or the like, can be used to supply the desired metal, or metals, in formation of the complex metal silicates. Exemplary of such salts are lithium chloride, lithium bromide, cupric chloride, cupric sulfate, magnesium cloride, magnesium bromide, magnesium sulfate, magnesium sulfide, zinc acetate, zinc chloride, zinc bromide, scandium bromide, scandium sulfate, aluminum chloride, aluminum bromide, aluminum acetate, aluminum nitrate, aluminum phosphate, aluminum sulfate, gallium nitrate, gallium sulfate, titanium bromide, titanium trichloride, titanium tetrachloride, titanium oxydichloride, zirconium dibromide, zirconium sulfate, zirconyl bromide, vanadium bromide, vanadium trichloride, vanadyl sulfate, chromic acetate, chromic chloride, chromic nitrate, chromic sulfate, molybdenum oxydibromide, tungsten trisulfide, rhenium trichloride, ruthenium tetrachloride, rhodium sulfate, rhodium trichloride, osmium trichloride, iridium tetrachloride, manganous sulfate, ferric chloride, ferrous chloride, ferrous sulfate, cobaltous nitrate, cobaltous sulfate, nickel chloride, nickel bromide, palladium chloride, palladium sulfate, platinic tetrachloride, and the like.

Many hydroxides, oxides, or oxygenated anions of these various metals can also be employed, and these are particularly useful where it is desirable to increase the pH of the solution over and above that practical by a relatively weak base. Illustrative of such compounds are magnesium hydroxide, magnesium oxide, sodium tungstate, sodium molybdate, sodium chromate, sodium vanadate, and the like. Other metal sources can also be employed, e.g., chloroplatinic acid, chloropalladous acid, and the like.

Likewise, any form of rare earth compound which is sufficiently soluble and compatible with the reaction mixture can be used as a source of the rare earth metal. Exemplary of these are: lanthanum chloride, lanthanum bromide, lanthanum sulfate, cerium chloride, cerium bromide, cerium sulfate, praeseodymium chloride, praeseodymium bromide, praeseodymium sulfate, neodymium chloride, neodymium bromide, neodymium sulfate, samarium chloride, samarium bromide, samarium sulfate, europium chloride, europium bromide, europium sulfate, gadolinium chloride, gadolinium bromide, gadolinium sulfate, dysprosium chloride, dysprosium bromide, dysprosium sulfate, and the like. A commercially available mix of the chlorides containing 50% Ce, 25% La and 25% other rare earths can also be used.

The relative amounts of the silica and metal sources are most easily determined by the stoichiometry of the desired product, through the use of exact stoichiometric amounts of these materials in a given reaction mixture is unnecessary. Typically, the sources of silica and metal are used in quantities (calculated as the oxides) sufficient to provide a reaction mixture having about 1 to about 2, and preferably from about 1.4 to about 1.6, moles of a mixture of metals, at least one of which, is a rare earth metal, per mole of the silica.

The invention will be further illustrated by the examples which follow. These examples are given solely for the purpose of illustration, and are not to be taken in a limiting sense. All parts and percentages in these examples are by weight, unless otherwise indicated.

EXAMPLE I

The catalyst is prepared by dissolving 1,041 grams of magnesium chloride hexahydrate and 309 grams of aluminum chloride hexahydrate in 539 cc. of $H_2O$. 845 grams of the silica source, which in this case comprises colloidal silica sol (150 A particle size, sold by Dupont under the trademark "Ludox LS-30"), is added to the aqueous solution. Then, 425 grams of sodium hydroxide is dissolved in 539 cc. of $H_2O$ and the solution added to the mixture to gel the silica and precipitate the magnesium, alumina and silica. Crystallization is then accomplished by heating at 250°C. for 24 hours. The several portions of catalysts are then de-watered by centrifugation, dried at 180°C., identified by X-ray diffraction, powdered, pressed on a hydraulic ram, the compacted forms of the catalyst crushed to 14 to 35 mesh (Tyler series), and then calcined at 540°C. for 16 hours. As synthesized, this synthetic chrysotile is designated at 20 mole percent Al, 80 mole percent Mg flakes (20 mole percent Al flakes). The surface area of this material is 392 $m^2/g$. This material is designated Catalyst A.

EXAMPLE II

Another synthetic chrysotile catalyst is prepared by dissolving 21.7 grams of aluminum chloride hexahydrate, 1.87 grams of lanthanum chloride heptahydrate, and 64.0 grams of magnesium chloride hexahydrate in 46 cc. of water. Ludox LS-30 silica sol is then added to this solution in an amount of 60 grams. A second solution, made up of 30 grams of sodium hydroxide is 30 cc. of water, is then added to this mix. The mixture is heated for 18 hours in a closed bomb at 500°F. The material is removed from the bomb, washed with water until chloride-free, and then dried in a vacuum oven at 120°C., overnight. As synthesized, this synthetic chrysotile is designated as 4 mole percent La, 13 mole percent Al, 82 mole percent Mg flakes (4 mole percent La flakes). The surface area of this material is 360 $m^2/g$. This catalyst is designated Catalyst B.

EXAMPLE III

Catalysts A and B are subjected to 100% steam at one atmosphere for 16 hours at 1400°F. Table I shows the surface areas (BET Method) of these materials before and after the steaming operation.

TABLE I

|  | Catalyst A | Catalyst B |
| --- | --- | --- |
| Surface area before treatment, $m^2/g$ | 392 | 360 |
| Surface area after treatment, $m^2/g$ | 21 | 154 |

This data shows that the incorporation of a rare earth metal into the catalyst significantly improves the stability of the chrysotile.

EXAMPLE IV

Catalysts A and B are tested with a cumene cracking reaction and compared with a lanthanum exchanged Y zeolite containing 17.1% lanthanum (as $La_2O_3$) which is designated Catalyst C. Each of these materials is calcined at 1000°F. In three separate runs, 0.3 gram of the Catalysts A, B and C is charged to a small flow reactor which is heated to 525°–540°F. in a sand bath. Cumene is vaporized into a flowing stream of helium and this mixture is passed over the catalyst (ca. 0.3 W/HR/W). Conversion of the cumene to benzene is measured by gas chromatographic analysis of the total reactor effluent. Results of these tests are given in Table II.

TABLE II

| Catalyst | A | B | C |
| --- | --- | --- | --- |
| Time on Feed, min. | 83 | 66 | 67 |
| Temp., °F. | 526. | 540. | 535. |
| Con., % | 38.8 | 87.4 | 72.5 |

This data clearly shows that the Catalyst B has superior cracking activity compared to Catalyst A. Further, the data indicates Catalyst B is superior in cracking activity to the very active La-Y zeolite.

EXAMPLE V

Another synthetic chrysotile catalyst is prepared in a manner identical to that of Example II except 1.87 grams of a commercial rare earth chloride mix containing 50% Ce, 25% La and 25% other rare earths was used. This catalyst is designated Catalyst D. Still another synthetic chrysotile catalyst is similarly prepared except 7.6 grams of the rare earth chloride mix was used. This catalyst is designated Catalyst E. Catalysts D and E are subjected to 100% steam at one atmosphere for 16 hours at 1400°F. Table III shows the surface area (BET Method) of these materials before and after the steaming operation.

TABLE III

|  | Catalyst D | Catalyst E |
|---|---|---|
| Surface area before treatment, m²/g | 315 | 311 |
| Surface area after treatment, m²/g | 24 | 177 |

These results, when compared with those for Catalyst B, show that lanthanum is the preferred rare earth and that a minimum of about 2–4 mole percent La is required to impart the derived steam stability.

The chrysotiles of the present invention can be effectively used in most hydrocarbon conversion reactions such as cracking, reforming, hydrocracking, aromatization, polymerization, alkylation, isomerization, hydrodesulfurization, and the like. Several examples of these are given below.

EXAMPLE VI

A synthetic chrysotile is prepared by dissolving 903 grams of magnesium chloride hexahydrate, 305 grams of aluminum chloride hexahydrate and 52.4 grams of lanthanum chloride heptahydrate in 538 grams of water. 845 grams of Ludox LS-30 was added to the aqueous solution. Then, 424 grams of sodium hydroxide is dissolved in 538 grams of $H_2O$ and added to the above mixture. Crystallization and subsequent treatment is identical to that described in Example I. As synthesized, this is designated 10 mole percent La flakes. A portion of this material is then mixed or cogelled with an amorphous catalyst (13% alumina and 87% silica) sufficient to provide 20% of the chrysotile in the finished catalyst. Such gel is then dried and screened to 40–60 micron particles. After steaming in 100% atmospheric pressure steam for 16 hours, the catalyst is tested for catalytic cracking of a heavy virgin gas oil. The conditions of this test are atmospheric pressure 950°F., 4 W/HR/W and 5 minute cycle length. Results are compared in Table IV with data obtained on standard commercially used silica-alumina and zeolite cracking catalysts.

TABLE IV

|  | Catalyst | | |
|---|---|---|---|
|  | Silica-Alumina | Zeolite | La Chrysotile Flakes[1] |
| Conversion percent | 75.2 | 88.1 | 71.0 |
| Yield, wt. percent |  |  |  |
| Coke | 3.1 | 4.0 | 8.5 |
| $C_3^-$ | 11.3 | 11.5 | 8.3 |
| $C_4$ | 13.2 | 14.1 | 7.7 |
| $C_5$–300°F. | 22.9 | 29.5 | 19.7 |
| 300°–650°F. | 26.4 | 29.6 | 26.8 |
| 650°F.+ | 24.7 | 11.9 | 29.0 |

(1) 20% chrysotile = 80% Silica-Alumina.

This data shows that La chrysotile is active for catalytic cracking and possesses a selectivity pattern distinct from that of commercial silica-alumina or zeolite cracking catalysts. It produces significantly less $C_3^-$ gas and $C_4$'s while at the same time favoring the production of middle distillate materials (300°–650°F.) over gasoline. One drawback with this catalyst is the high coke yield.

EXAMPLE VII

A portion of the 10 mole percent La flakes described in Example VI is extruded with nickel nitrate hexahydrate and ammonium nitrotungstate octahydrate to give 3.8 percent $NiO$ and 18.8 percent $WO_3$ on the catalyst. This catalyst is tested for the hydrocracking of a vacuum gas oil at 0.9 V/HR/V, 685°F., 1500 psig and 5–7 MSCF/B hydrogen gas rate. A similar test is carried out on a commercially zeolite hydrocracking catalyst. Results are compared in Table V.

TABLE V

|  | Catalyst | |
|---|---|---|
|  | La Chrysotile Flakes | Zeolite |
| Relative Activity | 1 | 1.25 |
| Selectivity to 300°–570°F. Material at 50% conversion, vol. % | 82 | 75 |

This data clearly shows that although the zeolite is slightly more active than the chrysotile, the La chrysotile catalyst possesses a distinctly superior selectivity toward the production of middle distillate materials.

It will be obvious to those skilled in the art that many modifications and changes may be made within the scope of the present invention which has a principal feature the substitution of a rare earth in a synthetic chrysotile catalyst. These chrysotiles can be used in hydrocarbon conversion reactions in either their pure state, mixed with other catalytic materials or impregnated with catalytic metals such as Co, Mo, Ni, Pt, Pd, and the like, as will be apparent to those skilled in the art.

What is claimed is:

1. A synthetic chrysotile of the general formula:

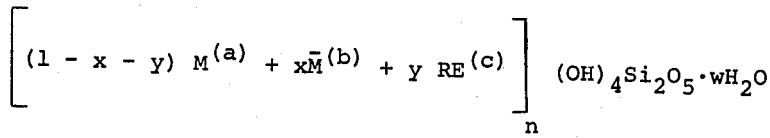

$$\left[ (1 - x - y) M^{(a)} + x\bar{M}^{(b)} + y RE^{(c)} \right]_n (OH)_4 Si_2 O_5 \cdot w H_2 O$$

where M and $\bar{M}$ are selected from monovalent and multivalent metal cations, of Groups IA, IB, IIA, IIB, IIIA, IIIB, IVB, VB, VIB, VIIB and VIII of the Periodic Table of Elements, having an effective ionic radius ranging from about 0.5 to about 1.0 A, RE is a metal selected from the group of rare earth metals, $x$ is a number which expresses the atomic fraction of the metal $\bar{M}$ and ranges from about 0 to 0.30, $y$ is the atomic fraction of RE and ranges from about 0.02 to about 0.20, $a$ is the valence of M and is an integer ranging from 1 to 7, $b$ is the valence of $\bar{M}$ and is an integer ranging from 1 to 7, $c$ is the valence of RE and is an integer ranging from 1 to 4, $n$ is a number equal to the value defined by the ratio $6/[a(1-x-y)+bx+cy]$, and $w$ is a number ranging from 0 to 4.

2. The synthetic chrysotile according to claim 1 wherein M is selected from the group consisting of Mg, Co and Ni.

3. The synthetic chrysotile according to claim 2 wherein $\bar{M}$ is selected from the group consisting of V, Cr, Mo, W, Mn, Re, Cu, Al, Zn and the Group VIII metals.

4. The synthetic chrysotile according to claim 2 being in the form of flakes having a surface area of from about 250 m²/g to about 600 m²/g.

5. The synthetic chrysotile according to claim 2 wherein the RE is lanthanum.

6. The synthetic chrysotile according to claim 2 wherein $x$ ranges from between about 0.05–0.25, and $y$ ranges from between about 0.02–0.10.

7. The synthetic chrysotile according to claim 2 wherein $\overline{M}$ is aluminum.

8. The synthetic chrysotile according to claim 7 wherein RE is lanthanum.

9. The synthetic chrysotile according to claim 8 wherein $x$ ranges from between about 0.05–0.25, and $y$ ranges from between about 0.02–0.10.

10. The synthetic chrysotile according to claim 9 being in the form of flakes having a surface area of from about 250 m²/g to about 600 m²/g.

* * * * *